(12) United States Patent
Cocchi et al.

(10) Patent No.: US 10,772,341 B2
(45) Date of Patent: *Sep. 15, 2020

(54) MACHINE AND METHOD FOR MAKING AND DISPENSING LIQUID, SEMI-LIQUID AND/OR SEMI-SOLID FOOD PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,735

(22) Filed: May 26, 2017

(65) Prior Publication Data

US 2017/0280744 A1 Oct. 5, 2017

Related U.S. Application Data

(62) Division of application No. 14/892,832, filed as application No. PCT/IB2014/061586 on May 21, 2014, now Pat. No. 9,693,571.

(30) Foreign Application Priority Data

May 24, 2013 (IT) .............................. BO2013A0260
Feb. 28, 2014 (IT) .............................. BO2014A0098

(51) Int. Cl.
*A23G 9/14* (2006.01)
*A23G 9/28* (2006.01)
(Continued)

(52) U.S. Cl.
CPC ................. *A23G 9/14* (2013.01); *A23G 9/16* (2013.01); *A23G 9/163* (2013.01); *A23G 9/166* (2013.01);
(Continued)

(58) Field of Classification Search
CPC .... A23G 9/00–9/52; A23G 9/30–9/305; A23C 3/02–3/0375; A23L 3/02–3/245
(Continued)

(56) References Cited

U.S. PATENT DOCUMENTS 2,784,565 A * 3/1957 Stalkup .................... A23G 9/16
                                                               62/125
2,961,853 A    11/1960 Cohrt
(Continued)

FOREIGN PATENT DOCUMENTS

CN    1388854 A    1/2003
CN    2621434 Y    6/2004
(Continued)

OTHER PUBLICATIONS

Translation of JP 02107160A (Year: 1990).*
(Continued)

*Primary Examiner* — Drew E Becker
(74) *Attorney, Agent, or Firm* — Shuttleworth & Ingersoll, PLC; Timothy J. Klima (57) ABSTRACT

A machine for making and dispensing liquid, semi-liquid and/or semi-solid food products and which includes at least a cylinder for containing and processing basic products, means for heating and cooling the cylinder wrapped around at least part of the cylinder and a mixer unit positioned inside the cylinder which is able to mix the basic products during their processing; the machine also includes a supply duct for supplying the products into the cylinder, a dispensing duct for withdrawing the food products from the cylinder and
(Continued)

means for recirculating the products contained in the containment and processing cylinder which are able to withdraw the products from the cylinder through the dispensing duct and to return them into the cylinder through the supply duct.

14 Claims, 4 Drawing Sheets

(51) Int. Cl.
    *A23G 9/16*     (2006.01)
    *A23G 9/30*     (2006.01)
    *A23G 9/22*     (2006.01)

(52) U.S. Cl.
    CPC ............... *A23G 9/22* (2013.01); *A23G 9/28* (2013.01); *A23G 9/281* (2013.01); *A23G 9/305* (2013.01)

(58) Field of Classification Search
    USPC ..................................... 426/524, 521–522
    See application file for complete search history.

(56) References Cited

U.S. PATENT DOCUMENTS

| | | | | |
|---|---|---|---|---|
| 2,975,617 | A * | 3/1961 | Wakeman | A23G 9/20 62/342 |
| 3,029,613 | A | 4/1962 | Lande et al. | |
| 3,729,177 | A | 4/1973 | Keyes et al. | |
| 3,811,494 | A * | 5/1974 | Menzel | A23G 9/04 165/65 |
| 3,829,242 | A * | 8/1974 | Duke | A23G 9/20 417/38 |
| 3,898,859 | A * | 8/1975 | Duke | A23G 9/12 62/135 |
| 3,930,535 | A | 1/1976 | Menzel | |
| 3,989,492 | A | 11/1976 | Keyes | |
| 4,479,423 | A * | 10/1984 | Schwitters | A23G 9/305 426/522 |
| 4,522,041 | A * | 6/1985 | Menzel | A23G 9/04 165/122 |
| 4,607,494 | A | 8/1986 | Cipelletti | |
| 4,625,525 | A | 12/1986 | Bradbury et al. | |
| 4,680,944 | A | 7/1987 | Menzel | |
| 4,703,628 | A | 11/1987 | Togashi et al. | |
| 4,848,381 | A | 7/1989 | Livingston et al. | |
| 4,860,550 | A | 8/1989 | Aoki et al. | |
| 4,964,542 | A * | 10/1990 | Smith | A23G 9/04 222/146.6 |
| 5,016,446 | A * | 5/1991 | Fiedler | A23G 9/163 222/146.6 |
| 5,201,861 | A * | 4/1993 | Menzel | A23G 9/045 62/135 |
| 5,447,371 | A | 9/1995 | Agapiou | |
| 5,503,064 | A * | 4/1996 | Scheel | A23B 5/0055 422/117 |
| 5,615,559 | A * | 4/1997 | Kress | A23G 9/16 62/136 |
| 5,692,392 | A | 12/1997 | Swier | |
| 5,799,832 | A | 9/1998 | Mayo | |
| 5,962,035 | A | 10/1999 | Masse et al. | |
| 6,142,340 | A | 11/2000 | Watanabe et al. | |
| 6,189,440 | B1 * | 2/2001 | Amundson | A23C 3/033 99/452 |
| 6,490,872 | B1 | 12/2002 | Beck et al. | |
| 6,494,055 | B1 | 12/2002 | Meserole et al. | |
| 7,640,755 | B1 | 1/2010 | Kateman | |
| 7,681,761 | B2 | 3/2010 | Harra | |
| 8,316,761 | B2 | 11/2012 | Bravo et al. | |
| 8,758,678 | B2 | 6/2014 | Cocchi et al. | |
| 9,402,408 | B2 | 8/2016 | Cocchi et al. | |
| 9,693,571 | B2 * | 7/2017 | Cocchi | A23G 9/14 |
| 2002/0162577 | A1 | 11/2002 | Cocchi | |
| 2004/0003620 | A1 | 1/2004 | Cocchi et al. | |
| 2004/0035640 | A1 | 2/2004 | Barnard et al. | |
| 2004/0251270 | A1 | 12/2004 | Davis et al. | |
| 2005/0098575 | A1 | 5/2005 | Carhuff et al. | |
| 2005/0103213 | A1 * | 5/2005 | Dumm | A23C 3/031 99/483 |
| 2005/0269362 | A1 | 12/2005 | Guerrero et al. | |
| 2006/0024418 | A1 * | 2/2006 | White | A23G 9/14 426/565 |
| 2006/0185755 | A1 | 8/2006 | Vaughn | |
| 2006/0240159 | A1 | 10/2006 | Cash et al. | |
| 2006/0243310 | A1 | 11/2006 | Cocchi et al. | |
| 2006/0261086 | A1 | 11/2006 | Schroeder et al. | |
| 2007/0102448 | A1 | 5/2007 | Harra | |
| 2007/0114228 | A1 * | 5/2007 | Cocchi | A23G 9/305 219/679 |
| 2007/0275131 | A1 * | 11/2007 | Bertini | A23G 9/00 426/115 |
| 2008/0295865 | A1 | 12/2008 | Ahn | |
| 2010/0101235 | A1 | 4/2010 | Cocchi et al. | |
| 2012/0251697 | A1 * | 10/2012 | Cocchi | A23G 9/045 426/521 |
| 2013/0064034 | A1 | 3/2013 | Almblad et al. | |
| 2013/0140328 | A1 | 6/2013 | Gates et al. | |
| 2014/0335232 | A1 * | 11/2014 | Halachmi | A23G 9/00 426/87 |
| 2015/0245634 | A1 | 9/2015 | Lazzarini et al. | |
| 2019/0110498 | A1 | 4/2019 | Minard | |
| 2019/0150471 | A1 | 5/2019 | Wadle et al. | |

FOREIGN PATENT DOCUMENTS

| | | |
|---|---|---|
| CN | 1780785 A | 5/2006 |
| CN | 101175412 A | 5/2008 |
| CN | 101263838 A | 9/2008 |
| CN | 101790319 A | 7/2010 |
| CN | 102726590 A | 10/2012 |
| EP | 0729707 A2 | 9/1996 |
| EP | 2279669 A2 | 2/2011 |
| EP | 2491792 A1 | 8/2012 |
| JP | H02107160 A | 4/1990 |
| JP | H0690669 A | 4/1994 |
| JP | H06181732 A | 7/1994 |
| JP | 2001169729 A | 6/2001 |
| JP | 2002017268 A | 1/2002 |
| JP | 2006271221 A | 10/2006 |
| JP | 2006523459 A | 10/2006 |
| WO | WO0121007 A1 | 3/2001 |
| WO | 2004091324 A2 | 10/2004 |
| WO | WO2009/027757 A1 | 3/2009 |
| WO | 2014003881 A1 | 1/2014 |

OTHER PUBLICATIONS

International Search Report and Written Opinion dated Sep. 17, 2014 from related PCT Application No. PCT/IB2014/061586.
Italian Search Report dated Nov. 11, 2014 for related Application No. BO20140237 [20545-0820].
Italian Search Report dated Nov. 11, 2014 from related Italian Application No. BO20140236 [20545-0821].
Chinese Office Action dated Apr. 4, 2018 from related Chinese Patent Application No. 201510312036.8 [20545-0821].
Japanese Office Action dated Feb. 27, 2019 for related Japanese Patent Application No. JP 2015-085788 [20545-0821].
English translation of Japanese Office Action dated Feb. 7, 2019 for related Japanese Patent Application No. 2015085787 [120545-0820].
Chinese Office Action dated Aug. 5, 2019 for counterpart Chinese Patent Application No. 201510297164.X.

* cited by examiner

MACHINE AND METHOD FOR MAKING AND DISPENSING LIQUID, SEMI-LIQUID AND/OR SEMI-SOLID FOOD PRODUCTS

This application is a divisional of U.S. patent application Ser. No. 14/892,832 filed Nov. 20, 2015, which is a National Phase of International Application PCT/162014/061586 filed May 21, 2014. This application claims priority to Italian Patent Application No. BO2013A000260 filed May 24, 2013, and Italian Patent Application No. BO2014A000098 filed Feb. 28, 2014. All applications are incorporated by reference herein.

TECHNICAL FIELD

This invention relates to a machine and a method for making and dispensing liquid, semi-liquid and/or semi-solid food products such as, for example, soft ice cream and the like.

More specifically, this invention relates to machines for making and dispensing soft ice cream where the basic products are contained in sealed containers, such as, for example, containment tanks or containers of the type known as "bag in box".

BACKGROUND ART

Generally speaking, machines for making and dispensing ice cream of this kind comprises a tank for containing the basic products, into which the liquid or semi-liquid ingredients (that is, the liquid or semi-liquid basic products) are fed and where the selfsame basic products are processed.

The containment tank internally comprises a mixer for the basic products which guarantees that the basic products are mixed continuously during processing.

The tank is wrapped in coils through which a heat exchange fluid is made to flow. The heat exchange fluid heats or cools the tank and, consequently, the products therein, according to set thermal cycles.

More specifically, during a thermal cycle for pasteurizing the basic products inside the containment tank, the heat exchange fluid heats the containment tank and, consequently, the products therein to temperatures of between 65° and 85° C.

During this thermal cycle, the mixer continuously stirs the products being processed so that the end product has a smooth, homogeneous consistency.

When the pasteurization cycle is over, the product in the tank is cooled and brought to a temperature of around 4° C. suitable for its storage, thereby obtaining the ice cream.

During the product cooling and storage cycle, the heat exchange fluid cools the containment tank and, consequently, the products therein.

In the ice cream production sector, it is known that good and well carried out pasteurization makes a product of high quality.

In machines of known type, as described above, however, it has been found that during the pasteurization of the basic products inside the containment tank, the product in contact with the tank walls, and more specifically, the walls around which the coils for the heat exchange fluid are wrapped, tends to become very hot, despite the continuous action of the mixer.

Localized burning of the basic product may lead to the formation of lumps in the product, which negatively affect the quality of the basic product being processed in terms of smooth, homogeneous consistency, thus producing a poorer quality ice cream.

DISCLOSURE OF THE INVENTION

The aim of this invention is to overcome the above mentioned disadvantage.

According to the invention, this aim is achieved by a machine and a method for making and dispensing liquid, semi-liquid and/or semi-solid food products.

BRIEF DESCRIPTION OF THE DRAWINGS

The technical features, with reference to the above aim, are clearly described herein and the advantages are apparent from the detailed description which follows, with reference to the accompanying drawings which illustrate a non-limiting example embodiment and in which.

DETAILED DESCRIPTION OF PREFERRED EMBODIMENTS OF THE INVENTION

With reference to FIGS. 1 to 4, the numeral 1 denotes a machine for making and dispensing liquid, semi-liquid and/or semi-solid food products such as, for example, soft ice cream and the like.

Preferably, the machine 1 is used to make ice cream (or similar products) and, more specifically what is generally known as "soft ice cream".

The machine 1 comprises a cylinder 2 for containing and processing basic products, means 3 for heating and cooling the cylinder 2, wrapped around at least part of the cylinder 2.

Since the basic product is processed in the containment and processing cylinder 2 until it has the consistency of ice cream, the cylinder 2 also acts as a mixing and cooling cylinder.

The heating and cooling means 3 comprise coils 4 in which a heat exchange fluid flows.

More precisely, the cylinder 2 has a leading end wall 6, a trailing end wall 7 and a perimeter side wall 5 joining the trailing end wall 7 to the leading end wall 6.

Preferably, the heating and cooling means 3 are wrapped around at least part of the side wall 5 of the cylinder 2.

The machine 1 comprises a mixer unit 8 positioned inside the cylinder 2 and able to mix the basic products while they are being processed.

The mixer unit 8 rotates about its axis of rotation R.

More specifically, the axis R is horizontal.

In an alternative embodiment not illustrated, the cylinder 2 defines a tank for containing and processing the basic products and internally comprising a mixer unit 8 which rotates about its axis of rotation R which, in this case, is vertical.

The mixer unit 8 comprises one or more blades 9 which extend in a direction substantially transversal to the axis of rotation R of the mixer 8 itself.

Preferably, the blades 9 extend towards the side wall 5 of the cylinder 2 in such a way as to define a clearance gap 7a for the basic products to pass through.

Preferably, the clearance gap 7a is limited in cross section size so as to prevent the basic product from sticking to the side wall 5 of the cylinder 2 during processing.

The machine 1 comprises at least a supply duct 10 for supplying the products into the containment and processing cylinder 2 and at least a dispensing duct 11 for withdrawing the food products from the cylinder 2.

The supply duct 10 and the dispensing duct 11 extend from the cylinder 2 and outwardly therefrom.

Preferably, the supply duct 10 and the dispensing duct 11 extend from the side wall 5 and from the leading end wall 6 of the cylinder 2, respectively.

Alternatively, both the supply duct 10 and the dispensing duct 11 extend from the side wall 5 of the cylinder 2.

According to the invention, the machine 1 comprises means 12 for recirculating the products contained in the containment and processing cylinder 2 which is able to withdraw the products from the cylinder 2 through the dispensing duct 11 and to return them into the cylinder 2 through the supply duct 10.

Advantageously, in addition to the action of the mixer unit 8, the recirculation means 12 apply a further stirring action to the basic products inside the processing cylinder 2.

This prevents the basic products being processed in the cylinder 2 from sticking to the wall 5 thereof, especially during high temperature cycles such as, for example, the pasteurization cycle.

Figure 4:
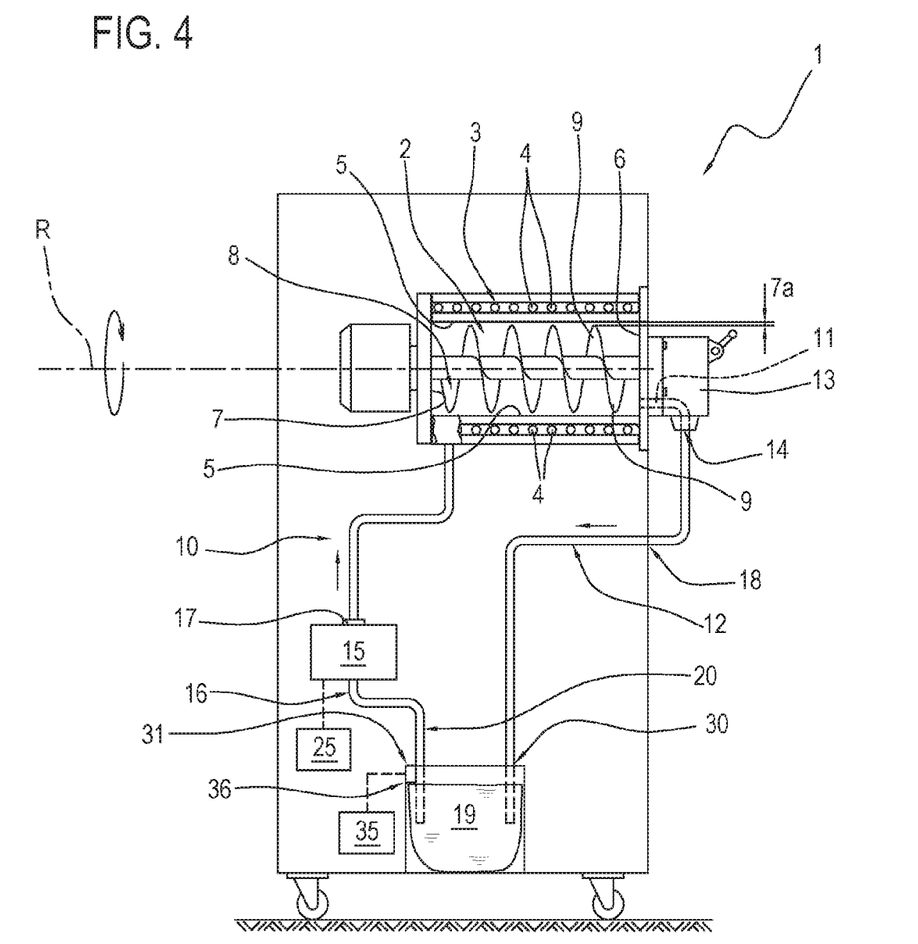
FIG. 4 shows a schematic front view of the machine of the invention according to a fourth embodiment thereof.

According to the invention, the machine comprises a removable container 19 for feeding basic products and provided with a product infeed channel 30 and a product outfeed channel 31.

This container is preferably a container of the type known as "bag in box" (as illustrated in FIG. 4).

The infeed channel 30 is connected, in use, to the dispensing duct 11 and the outfeed channel 31 is connected, in use, to the supply duct 10 in order to allow recirculating the product between the containment cylinder 2 and the removable container 19.

That way, recirculation is effected between the containment cylinder 2 and the removable container 19 so that the contents of the removable container 19 undergo what is known as "recycling" pasteurization.

That means it is not necessary to disconnect the removable container 19 from the machine (that is, from the cylinder 2) to allow the basic mix inside the removable container 19 to be pasteurized.

The machine 1 comprises a dispensing tap 13 for withdrawing the food products from the cylinder 2. The tap 13 has a product dispensing outlet 14.

The dispensing tap 13 is connected to the dispensing duct 11 of the cylinder 2.

Figure 2:
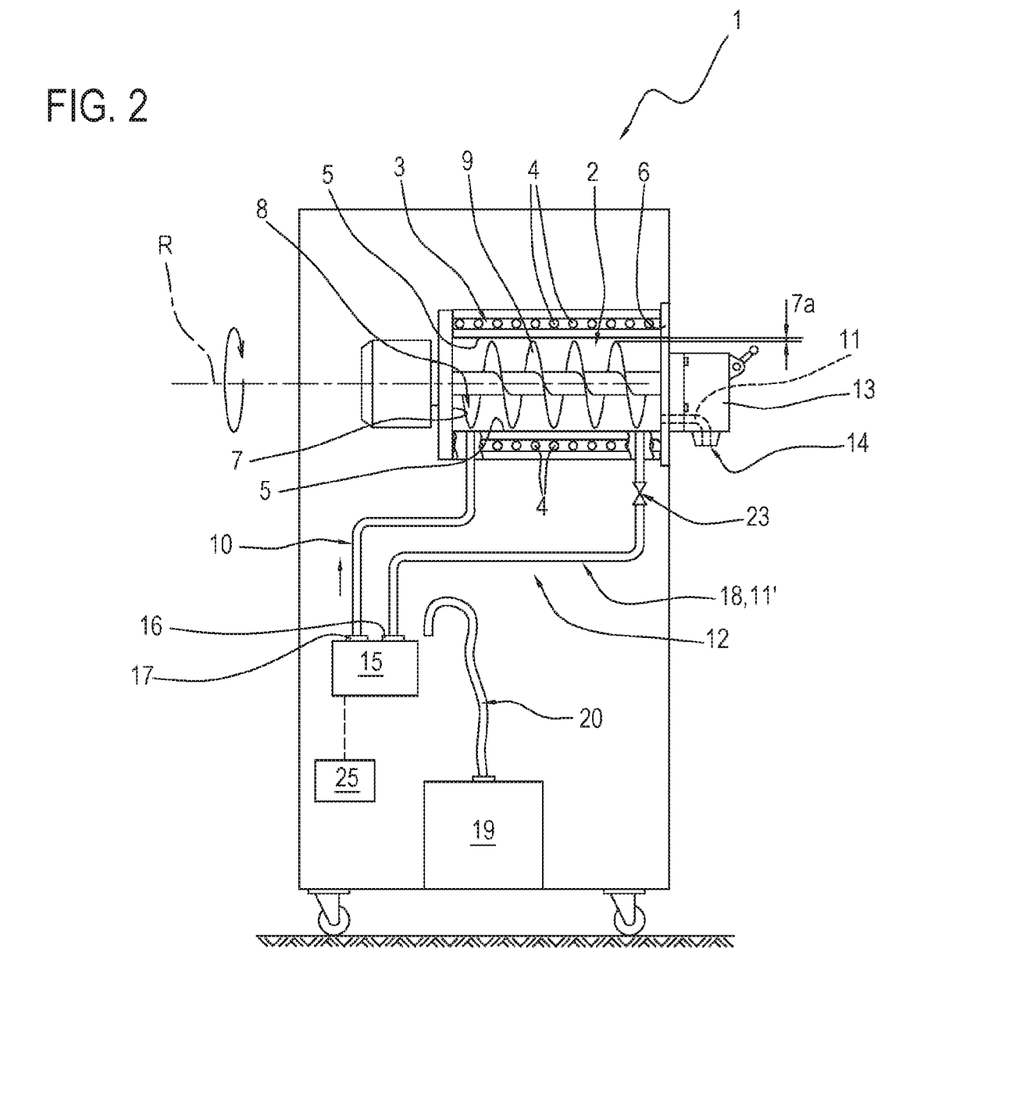
FIG. 2 shows a schematic front view of the machine of the invention according to a second embodiment thereof.

In the second embodiment, the recirculation means 12 for recirculating the products contained in the cylinder 2 withdraw the products from the cylinder 2 through the dispensing duct 11 and return them into the cylinder 2 through the supply duct 10.

The recirculation means 12 comprise a pump 15 having an infeed section 16 and a delivery section 17.

Advantageously, the pump 15 is a peristaltic pump.

Preferably, recirculation performed by the recirculation means 12 is continuous.

Preferably, in the embodiment illustrated in FIG. 4, the recirculation means 12 perform continuous recirculation between the removable container 19 and the cylinder 2.

Alternatively, recirculation performed by the recirculation means is intermittent.

The continuous or intermittent recirculation mode depends on the operating mode of the pump 15.

Figure 1:
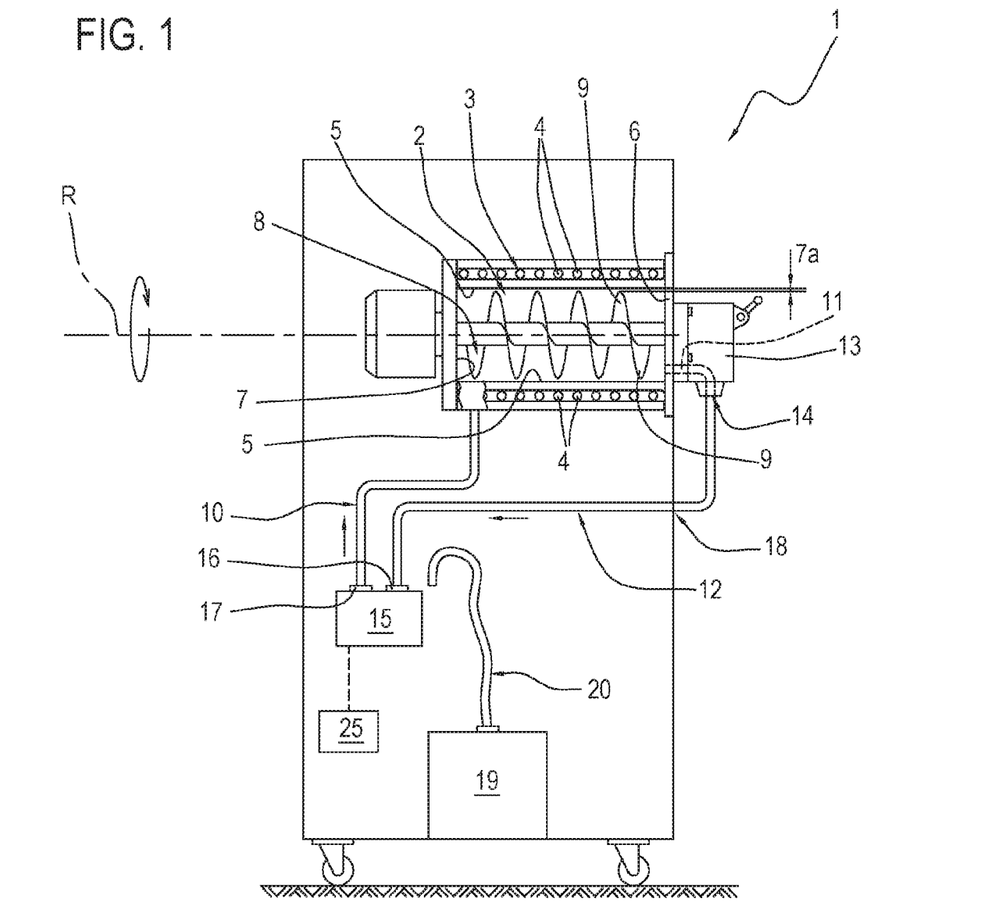
FIG. 1 shows a schematic front view of the machine of the invention according to a first embodiment thereof.

In the embodiment illustrated in FIG. 1, the delivery section 17 is connected to the supply duct 10 and the infeed section 16 is connected to the dispensing duct 11.

In a first variant embodiment, the infeed section 16 is connected to the dispensing duct 11 through the dispensing tap 13, in particular through the dispensing outlet 14 thereof, as illustrated in FIG. 1.

In a second variant embodiment, the infeed section 16 is connected directly to the dispensing duct 11, as illustrated in FIG. 2.

Advantageously, the machine 1 comprises a duct 18 for connecting the infeed section 16 of the pump 15 to the dispensing duct 11.

In the second embodiment, illustrated in FIG. 2, the connecting duct 18 leads into the cylinder 2, more specifically through the perimeter side wall 5.

In this embodiment, the connecting duct 18 comprises a shutoff valve 23 capable of opening the duct 18, during recirculation of the basic products.

In this embodiment, the connecting duct 18 acts as dispensing duct 11'.

It should be noted that in soft ice cream machines, the basic products to be fed into the cylinder 2 to make the ice cream are stored in dedicated containers 19.

Preferably, but not necessarily, the containers 19 are of the "bag in box" type, that is to say, they consist of a hard container and a soft container placed inside the hard container and containing the basic products.

The machine 1 comprises a duct 20 for sucking in the basic products to be fed into the containment and processing cylinder 2.

The pump 15 is designed to withdraw the basic products from the container 19 through the suction duct 20 and to transfer the same into the containment and processing cylinder 2 through the supply duct 10.

According to the invention, the infeed section 16 of the pump 15 is connectable to the suction duct 20 and to the dispensing duct 11 of the cylinder 2, alternately.

The connection between the infeed section 16 of the pump 15 and the suction duct 20 and dispensing duct 11 changes as a function of the steps in the ice cream production process.

More specifically, to transfer the basic products from the container 19 to the cylinder 2 by means of the pump 15, the infeed section 16 of the pump 15 is connected to the suction duct 20.

During the cycle when the basic products in the cylinder 2 are pasteurized, the infeed section 16 of the pump 15 is connected to the dispensing duct 11.

Figure 3:
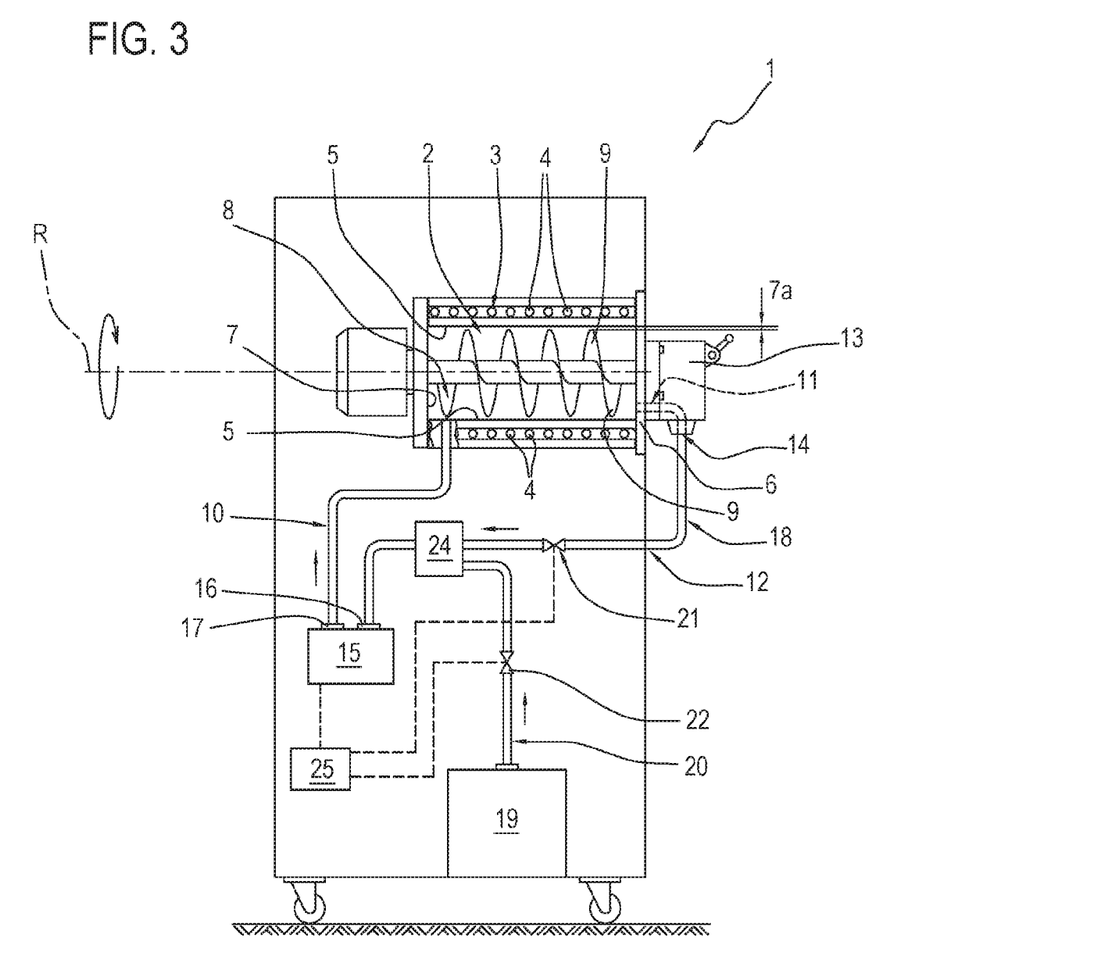
FIG. 3 shows a schematic front view of the machine of the invention according to a third embodiment thereof.

In a third embodiment, illustrated in FIG. 3, the pump 15 comprises a common by-pass section 24 upstream of the infeed section 16 and connected thereto.

The connecting duct 18 and the suction duct 20 merge into the common by-pass section 24.

The connecting duct 18 and the suction duct 20 are equipped with a first and a second shutoff valve 21 and 22, respectively.

In this embodiment, acting on the first shutoff valve 21 causes the connecting duct 18 to close, so that the pump 15 sucks the basic products through the suction duct 20 and fills the cylinder 2 through the supply duct 10.

Once the cylinder 2 is full, the suction duct 20 can be closed by acting on the second shutoff valve 22 and the connecting duct 18 can be opened by acting on the first shutoff valve 21.

The machine 1 comprises a control unit 25 logically connected to the first and second shutoff valves 21 and 22 and capable of opening and closing these valves 21 and 22 during the operation of the machine 1.

That way, the pump 15 recirculates the products inside the cylinder 2 by withdrawing them through the dispensing duct 11 and returning them into the cylinder through the supply duct 10, preferably continuously.

In use, the pump 15 transfers the basic products from the container 19 to the tank 2 (that is, the cylinder 2) until the latter is full.

When the cylinder 2 is full, the products inside the cylinder 2 itself (and, in the embodiment illustrated in FIG. 4, the basic products inside the container 19) undergo the pasteurization cycle.

During the pasteurization cycle, the recirculation means 12 withdraw the products being processed from the cylinder 2 through the dispensing duct 11 and return them into the cylinder 2 through the supply duct 10. This prevents the products being processed from sticking to the walls 5, 6 and 7 of the cylinder 2 which reach temperatures between 65° and 85° C.

More specifically, the recirculation means 12 stop the products being processed from sticking to the walls 5, 6, 7 of the cylinder 2, wrapped in the heating and cooling means 3, in particular the side wall 5.

The recirculation means 12 also stop the products being processed from sticking to the leading end wall 6 and the trailing end wall 7 of the cylinder 2.

The recirculation means 12 apply a stirring action to the products being processed, added to the stirring action applied by the mixer unit 8.

More specifically, in the embodiment illustrated in FIG. 4, the recirculation means 12 withdraw the products from the removable container 19 and make them recirculate through the cylinder 2 (preferably by means of a pump 15).

Advantageously, the contents of the removable container 19 can thus be pasteurized without disconnecting the container from the cylinder 2.

When the pasteurization cycle is over, the products being processed undergo a cooling cycle and a storage cycle, thus obtaining a finished product, that is, ice cream, from the basic products.

The pump 15 is activated by a control unit 25 as a function of the operating cycle of the machine 1.

During the cooling and storage cycle, the heating and cooling means 3 cause the heat exchange fluid to flow in the coils 4 in order to remove heat from the cylinder 2, thereby cooling it.

Usually, the heating and cooling means 3 cool the cylinder 2 to a temperature of around 4° C. which is also the ice cream storage temperature.

At this point, the ice cream inside the cylinder 2 can be withdrawn through the dispensing tap 13.

According to another aspect, the machine 1 comprises a memory designed to save a piece of information relating to the opening time of the removable container 19.

The term "opening time" is used to denote a piece of time information indicating when the removable container 19 was opened, that is to say, when it was first used in the machine.

For example, the piece of time information may comprise one or more of the following pieces of information:
the date the removable container 19 was opened;
the time the removable container 19 was opened;
the interval of time elapsed since the removable container 19 was opened.

In effect, it should be noted that the infeed channel 30 and the outfeed channel 31 are initially closed: they are opened (perforated) when the removable container is used for the first time in the machine 1.

According to this aspect, it should be noted that the machine comprises a memory control unit 35 (which may or may not form part of the control unit 25 of the machine) configured to measure the time the removable container 19 is connected to the cylinder 2.

The control unit 35 updates the opening time information when the removable container 19 is connected to the cylinder 2 for the first time (for example, saving the date and/or the time of opening or starting a time count indicating the length of time elapsed since the container 19 was opened).

Also according to this aspect, the control unit 35 is è configured to provide an indication if the opening time of the removable container 19 in the machine is greater than a preset value (this value preferably corresponding to 24 hours or 72 hours).

It should be noted that the preset value is such that if the product inside the removable container 19 is used—for making the finished product—within this preset value, no food safety risk arises.

The preset value is thus selected to guarantee the food safety of the product made by the machine 1.

According to this aspect, the machine 1 comprises an indication unit (for example, a display or sound means) connected to the control unit 35 to provide an indication (visible and/or audible) if the opening time of the removable container 19 in the machine is greater than a preset value (also saved in the control unit 35 or in the memory itself).

Preferably, the control unit 35 comprises a sensor 36 for detecting when the removable container 19 is connected to the cylinder 2.

Preferably, in one embodiment, the control unit 35 comprises a level sensor for detecting the level of product in the removable container 19 and for establishing, based on the level detected, when said removable container 19 is connected to the cylinder 2 (in such a way as to update the opening time in the memory, if the removable container 19 is connected for the first time to the machine 1, that is, to the cylinder 2.

In another embodiment, the machine 1 comprises a connector for connecting the removable container 19 to the cylinder 2.

Preferably, the connector is configured to be connected to the infeed channel 30 and to the outfeed channel 31 of the removable container 19.

According to this aspect, the control unit 35 comprises a sensor, associated with the connector or with the removable container 19, for detecting a connection of the removable container 19 to the connector corresponding to a condition of connection of the removable container 19 to the cylinder 2.

Also defined according to the invention is a method for making and dispensing liquid, semi-liquid and/or semi-solid food products starting from basic products.

The method comprises:
a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing at least a supply duct 10 for supplying the products into the cylinder 2 and at least a dispensing duct 11 for withdrawing the food products from the cylinder 2;

a step of recirculating the products contained in the containment and processing cylinder 2.

It should be noted that the recirculating step comprises a step of withdrawing the products from the cylinder 2 through the dispensing duct 11, 11' and a step of returning them into the cylinder 2 through the supply duct 10.

The method, for the embodiment shown in FIG. 4, comprises:

a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing a removable container 19 for feeding basic products and provided with an infeed channel 30 and an outfeed channel 31;

a step of preparing at least a supply duct 10 for supplying the products into the cylinder 2 and at least a dispensing duct 11 for withdrawing the food products from the cylinder 2, the method being characterized in that it comprises at least in use a step of recirculating the products contained in the containment and processing cylinder 2;

a step of withdrawing the products from the cylinder 2 through the dispensing duct 11, 11';

a step of returning the products into the cylinder 2 through the supply duct 10;

a step of connecting the infeed channel 30 of the removable container 19 to the dispensing duct 11, 11' and connecting the outfeed channel 31 of the removable container 19 to the supply duct 10 to allow recirculating the product between the containment cylinder 2 and the removable container 19;

a step of recirculating the products between the containment cylinder 2 and the removable container 19 through the dispensing duct 11, 11', the supply duct 10, the infeed channel 30 and the outfeed channel 31.

The method comprises the step of transferring the basic products (from the removable container 19) into the containment and processing cylinder 2 followed by the step of recirculating the products inside the containment and processing cylinder 2 (between the cylinder 2 and the container 19 in the embodiment shown in FIG. 4).

Preferably, the step of recirculating the products between the containment and processing cylinder 2 and the removable container 19 is performed continuously, for a preset time interval.

The method relating to FIG. 4 comprises a step of preparing a removable container 19 for feeding the basic products and provided with an infeed channel 30 and an outfeed channel 31.

Preferably, the removable container 19 is of the type known as "bag in box".

It should be noted that if the basic products are in containers 19 of the "bag in box" type, when the step of transferring the basic products into the containment and processing cylinder 2 is over, the method comprises a step of disconnecting the suction duct 20 from the container 19.

That means, advantageously, that the container 19 can be kept separately from the machine 1.

Advantageously, therefore, the container 19 can be stored in a refrigerator to allow the basic product to be stored for re-use at a later stage. The recirculating step comprises a step of withdrawing the products from the cylinder 2 through the dispensing duct 11 and a step of returning them into the cylinder 2 through the supply duct 10.

Alternatively, the step of recirculating the products contained in the containment and processing cylinder 2 comprises the step of withdrawing the products from the cylinder 2 through the dispensing tap 13 and the step of returning them into the cylinder 2 through the supply duct 10.

The step of recirculating the products contained in the containment and processing cylinder 2 is preferably performed during the pasteurization cycle of the basic products.

This method comprises a step of connecting the recirculation means 12 to the supply duct 10 and to the dispensing duct 11 of the containment and processing cylinder 2, defining a circuit for the recirculation of the products inside the cylinder 2.

More specifically, the method comprises a step of disconnecting the infeed section 16 of the pump 15 from the container 19 of the basic products and connecting the infeed section 16 of the pump 15 to the dispensing duct 11 by means of at least one connecting duct 18.

To disconnect the infeed section 16 of the pump 15 from the container 19 the method comprises a step of disconnecting the suction duct 20 from the infeed section 16 of the pump 15.

Thus, in this step, the container 19 and the related suction duct 20 are detached from the pump 15.

If necessary, the container 19 and the related suction duct 20 can be kept separately from the machine 1. Alternatively, the method comprises a step of disconnecting the infeed section 16 of the pump 15 from the suction duct 20 of the basic products and connecting the infeed section 16 of the pump 15 to the dispensing tap 13 by means of at least one connecting duct 18. More specifically, the infeed section 16 of the pump 15 is connected to the dispensing outlet 14 of the dispensing tap 13.

According to another aspect, the method comprises:

a step of saving a piece of time information (opening time) indicating when the removable container 19 was opened;

a step of comparing said piece of time information saved with a preset value, for providing an indication if the time interval since opening is greater than the preset value.

According to this aspect, the method preferably comprises a step of detecting, by means of a sensor, when the removable container 19 is connected to the cylinder 2.

Advantageously, according to this aspect, it is possible to know at any time when the container was opened (that is, the time elapsed since opening): thus, the machine user knows immediately how long the removable container has been open and, based on this knowledge, can decide whether to dispose of the removable container 19 or use up its contents before they spoil.

Advantageously, during the pasteurization cycle, the basic products are stirred by the mixer unit 8 and recirculated by the recirculation means 12, thereby preventing them from sticking to the walls of the cylinder 2, in particular the side wall 5 in contact with the coils 4, and consequently the products being processed are prevented from burning.

That means the machine 1 produces a better quality ice cream than prior art machines because the recirculation means 12 improve the homogenization of the basic product mix during pasteurization.

Described below are some aspects applicable to one or more of the embodiments of the machine or of the method described above.

According to another aspect, the machine comprises an indication unit, connected to the control unit 35 for providing an indication when the removable container 19 has been open for a length time, calculated starting from the opening time saved in the memory, greater than a preset value.

According to yet another aspect, the control unit 35 comprises a level sensor for detecting the level of product in the removable container 19 and for establishing, based on the level detected, when said removable container 19 is connected to the cylinder 2.

The invention claimed is:

1. A method for performing a thermal cycle on a volume of product in a machine for making and dispensing a prepared food product including at least one chosen from a liquid, semi-liquid and semi-solid food product, comprising:
    providing a product container containing basic product;
    providing a freezing container for containing and processing the basic product into the prepared food product, the freezing container including a side wall encompassing a freezing chamber with a cylindrical internal wall;
    providing a supply duct for supplying the basic product into the freezing container;
    providing a recirculation duct for withdrawing the at least one chosen from the basic food product and the prepared food product from the freezing container;
    providing a recirculation loop including the supply duct, the recirculation duct and the freezing container by fluidly connecting the supply duct and a first end of the recirculation duct;
    recirculating the at least one chosen from the basic product and the prepared food product through the recirculation loop by withdrawing the at least one chosen from the basic product and the prepared food product from the freezing container through the recirculation duct and returning the at least one chosen from the basic product and the prepared food product into the freezing container through the supply duct;
    providing a heating system for operatively engaging a portion of the recirculation loop for heating the at least one chosen from the basic product and the prepared food product, wherein the heating system includes a heating portion at least partially encircling the cylindrical internal wall of the freezing chamber;
    performing the thermal cycle:
        by heating the at least one chosen from the basic product and the prepared food product to a pasteurization temperature through the cylindrical internal wall with the heating portion; and
        during the recirculating through the recirculation loop to avoid the at least one chosen from the basic product and the prepared food product from sticking to the cylindrical internal wall of the freezing container;
    providing a pump in the recirculation loop for recirculating the at least one chosen from the basic product and the prepared food product and performing the recirculating through the freezing container, the pump, the supply duct, and the recirculation duct connecting the freezing container and the pump, while simultaneously preventing recirculation through the product container and a dispensing tap of the freezing cylinder, the pump including only a single inlet such that the single inlet is physically connected to only one of a product duct and the recirculation duct at a time;
    selectively connecting the single inlet of the pump between 1) the product container for processing the basic product into the prepared food product and maintaining the prepared food product in a condition for serving, and 2) the freezing container for performing the thermal cycle by:
        physically connecting the single inlet of the pump to the product container with the product duct for supplying the basic product to the freezing container;
        physically disconnecting the single inlet from the product container by physically separating the product duct from the single inlet and spacing the product duct away from the single inlet, then connecting the single inlet to the recirculation duct for the recirculating;
    providing a valve in the recirculation duct and opening the valve during the recirculation and closing the valve while processing the basic product into the prepared food product and maintaining the prepared food product in the condition for serving;
    after performing the thermal cycle, subjecting the at least one chosen from the basic product and the prepared food product to a cooling and mixing cycle in the freezing container;
    providing that the product container of basic product is a removable container including an outlet connectable to the single inlet of the pump via the product duct and that the product container remains in place from the physically disconnecting the single inlet from the product container until again physically connecting the single inlet of the pump to the product container for again supplying the basic product to the freezing container.

2. The method according to claim 1, and further comprising disconnecting the container of basic product from the supply duct prior to performing the thermal cycle.

3. The method according to claim 2, and further comprising providing that the heating portion includes a thermally conductive portion positioned in operative engagement with the freezing container to transfer heat to the freezing container by thermal conduction.

4. The method according to claim 3, and further comprising providing that a second end of the recirculation duct opens to an interior of the freezing container.

5. The method according to claim 1, and further comprising providing that the removable container has a single opening.

6. The method according to claim 1, and further comprising providing a mixer in the cylinder and during the recirculating, activating the mixer in the cylinder in coordination with the pump to recirculate the at least one chosen from the basic product and the prepared food product.

7. The method according to claim 1, and further comprising providing a thermal treatment system at least partly encircling the cylindrical internal wall of the freezing chamber for freezing the basic product, wherein the heating portion is part of the thermal treatment system.

8. A machine for making and dispensing a prepared food product including at least one chosen from a liquid, semi-liquid and semi-solid food product, comprising:
    a receiving area for receiving a removable product container containing basic product, the removable product container including an outlet;
    a cylinder for containing and processing the basic product into the prepared food product, the cylinder including a side wall encompassing a freezing chamber with a cylindrical internal wall;
    a supply duct for supplying the basic product into the cylinder;

a recirculation duct for withdrawing the at least one chosen from the basic food product and the prepared food product from the cylinder;

a recirculation loop including the supply duct, the recirculation duct and the cylinder;

a heating system for heating the recirculation loop, the heating system including a heating portion at least partially encircling the cylindrical internal wall of the freezing chamber;

a recirculation system including the recirculation loop for recirculating the at least one chosen from the basic product and the prepared food product through the cylinder by withdrawing the at least one chosen from the basic product and the prepared food product from the cylinder through the recirculation duct and returning the at least one chosen from the basic product and the prepared food product into the cylinder through the supply duct, the recirculation system including the supply duct and the recirculation duct and further including a pump operatively connected between the supply duct and a first end of the recirculation duct for recirculating the at least one chosen from the basic product and the prepared food product through the cylinder to avoid the at least one chosen from the basic product and the prepared food product from sticking to the side wall of the cylinder during a time period where the at least one chosen from the basic product and the prepared food product is heated to a pasteurization temperature by the heating portion associated with the cylinder, the recirculation loop including the cylinder, the pump and the supply duct and the recirculation duct connecting the cylinder and the pump, while omitting the removable product container and a dispensing tap of the cylinder;

the pump including only a single inlet such that the single inlet is physically connected to only one of a product duct and the recirculation duct at a time to be selectively connectable to:

1) the outlet of the removable product container, by physically connecting the single inlet of the pump to the product container with the product duct, for supplying the basic product to the cylinder for processing the basic product into the prepared food product; and 2) the cylinder for the recirculating, by physically disconnecting the single inlet from the product container by physically separating the product duct from the single inlet and spacing the product duct away from the single inlet, and connecting the single inlet to the cylinder for the recirculating;

a valve positioned in the recirculation duct, the valve openable to allow the recirculation and closable to process the basic product into the prepared food product and maintain the prepared food product in a condition for serving;

a thermal treatment system for subjecting the at least one chosen from the basic product and the prepared food product to a cooling cycle in the cylinder;

wherein the removable product container remains in place from upon the physically disconnecting the single inlet from the product container until again physically connecting the single inlet of the pump to the product container for again supplying the basic product to the freezing container.

9. The machine according to claim 8, wherein the heating portion includes a thermally conductive portion positioned in operative engagement with the cylinder to transfer heat to the cylinder by thermal conduction.

10. The machine according to claim 9, wherein a second end of the recirculation duct opens to an interior of the cylinder.

11. The machine according to claim 9, and further comprising a connector for selectively operatively connecting the removable product container to, and disconnecting the removable product container from, the supply duct.

12. The machine according to claim 8, wherein the removable product container has a single opening.

13. The machine according to claim 8, and further comprising a mixer in the cylinder actuatable during the recirculating to assist in recirculating the at least one chosen from the basic product and the prepared food product.

14. The machine according to claim 8, wherein the thermal treatment system at least partly encircles the cylindrical internal wall of the freezing chamber and wherein the heating portion is part of the thermal treatment system.

\* \* \* \* \*